United States Patent [19]
Khatibi

[11] Patent Number: 5,467,571
[45] Date of Patent: Nov. 21, 1995

[54] SNAP FASTENER AND METHOD OF INSTALLING REMOVABLE TRIM

[76] Inventor: Janis M. Khatibi, 2805 194th Ave. SE., Issaquah, Wash. 98027

[21] Appl. No.: 183,497

[22] Filed: Jan. 19, 1994

[51] Int. Cl.$^6$ .................................................. A44B 21/00
[52] U.S. Cl. ............................... 52/718.04; 52/717.01; 52/506.05; 52/745.21; 403/406.1; 403/388
[58] Field of Search ............................ 52/717.01, 718.01, 52/718.04, 204.53, 242, 745.15, 745.21, 746, 290, 506.5, 511, 512, 746.1; 403/397, 388, 384, 406.1; 24/662, 694

[56] References Cited

U.S. PATENT DOCUMENTS

| | | | |
|---|---|---|---|
| 1,389,758 | 9/1921 | Holmes | 24/694 |
| 1,556,233 | 10/1925 | Maise | 52/511 |
| 1,760,265 | 5/1930 | Carr | 52/511 |
| 1,958,678 | 5/1934 | Place | 52/511 |
| 3,230,652 | 1/1966 | McNair | 52/718.01 X |
| 3,335,429 | 8/1967 | Arp | 52/718.01 X |
| 4,402,116 | 9/1983 | Schenck | 24/662 |
| 4,408,372 | 10/1983 | Kimura et al. | 24/662 |
| 4,874,276 | 10/1989 | Iguchi | 403/388 X |

*Primary Examiner*—Carl D. Friedman
*Assistant Examiner*—Robert J. Canfield
*Attorney, Agent, or Firm*—Robert J. Harter

[57] ABSTRACT

A method of installing trim employs a Snap Tack fastener which allows the trim to snap on and off when needed. The Snap Tack includes a ball head screw which snaps into a small plastic receptacle. In a typical application, several ball head screws are screwed into the back side of some floor molding. The molding, with the screws in place, is pressed against a wall where the molding is to be fastened. Enough pressure is applied to have the ball screws leave small indentations in the wall. Holes are drilled at the indentations, and the receptacles are installed in the holes. The molding with its screws can then be snapped into place and later removed when needed.

11 Claims, 5 Drawing Sheets

5,467,571

SNAP FASTENER AND METHOD OF INSTALLING REMOVABLE TRIM

BACKGROUND OF THE INVENTION

1. Field Of The Invention

The subject invention generally pertains to methods of mounting wood trim, and more specifically to a method that allows the trim to be readily removed and reinstalled time after time.

2. Description Of Related Art

Today, wood trim in commercial and home construction is simply nailed in place. Later, however, it becomes difficult to paint the walls without getting some paint on the trim. Prying the trim off is difficult and can often damage the trim or the wall. Moreover, nail holes on the exposed side of the trim are unsightly even when filled with putty.

SUMMARY OF THE INVENTION

To avoid the problems with today's method of installing wood trim, it is an object of the subject invention to provide a method of firmly mounting trim while rendering it readily removable.

Another object is to mount trim without having any exposed mounting hardware or nail holes.

Another object is to provide a method of mounting trim made of a material other than just wood, such as metal and plastic.

Another object is to provide a method of mounting trim to a solid two-by-four fir board or a relatively weak gypsum wall board.

Another object is to provide a quick and accurate method of marking the desired position of the round head screw or the receptacle so that the two are in radial alignment to each other.

Another object is to both imbed and fasten a receptacle in a wall or wood trim with a single hole.

Another object is to provide a ball head screw and receptacle combination where either one can be interchangeably mounted in either the trim or the wall.

Another object of the invention is to provide a snap fastener that can be installed with no more than two screws while maintaining alignment of the plug to the receptacle.

These and other objects of the invention are provided by a novel method of installing removable trim by screwing a ball head screw into the trim, using the ball head screw to accurately mark the desired location of a receptacle on a wall, drilling a hole in the wall at the marked location, screwing a plastic receptacle into the hole, aligning the ball head screw over the receptacle, and pushing the trim against the wall.

DESCRIPTION OF THE PREFERRED EMBODIMENT

Figure 1:
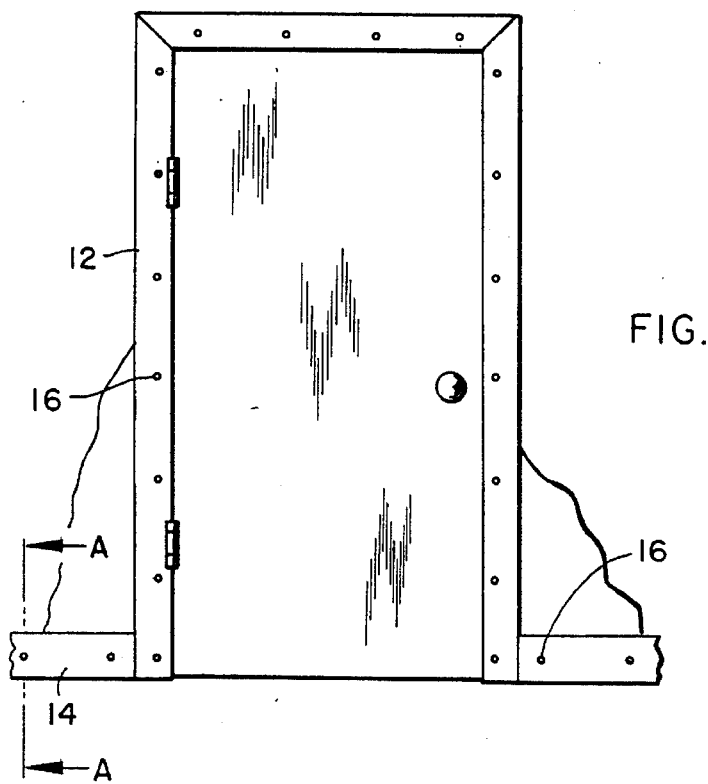
FIG. 1 shows door trim installed by way of the subject invention cross-section line A—A provides the viewing reference of FIGS. 3–10.

FIG. 1 illustrates door trim 12 and floor molding 14 held in place by several snap tacks 16. Snap tack 16 generally comprises a metal ball head screw 18 and a polymeric receptacle 20. The head 22 of each screw 18 has a curved top portion 24 and a curved bottom portion 26. A major outside diameter 28 is found where the top and bottom portions meet. Slot 30 allows a screw driver to be used in turning screw 18 into the work piece. Slot 30 represents any socket for which a tool can engage for the purpose of driving screw 18 in place. A few examples of a socket would include, but not be limited to, a Phillips head or an Allen head socket.

Figure 2:
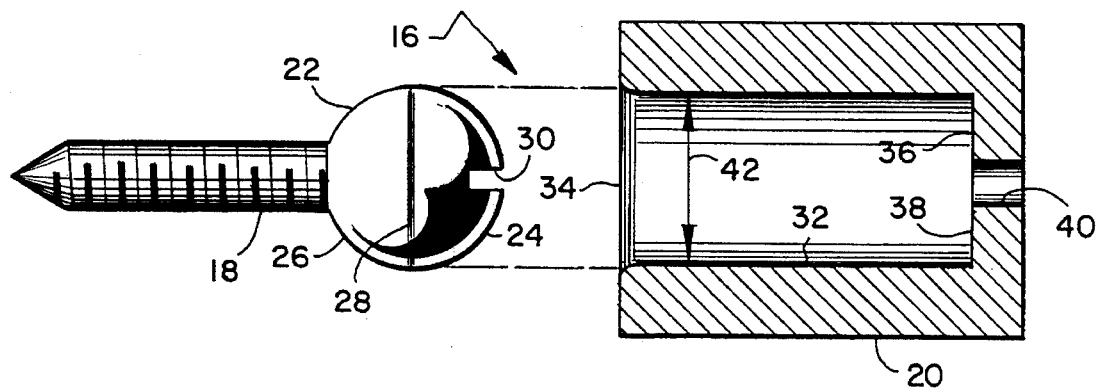
FIG. 2 shows a close up view of the invention.

Referring to FIG. 2, ball head screw 18 is meant to engage receptacle 20. Receptacle 20 has a generally cylindrical side wall bore 32 with one end 34 substantially open. Opposite end 36 is a substantially circular base 38 with an anchor hole 40. Over most of its length bore diameter 42 is less than the major diameter 28 of screw 18 except at end 34 where screw 18 enters. This feature accommodates a wide range of axial misalignment between screw 18 and receptacle 20. In one embodiment of the invention, receptacle 20 is made of nylon; however, a wide variety of other polymeric materials could be used. Some examples would include, but not be limited to, polyethylene, polypropylene, polyurethane, and rubber. For smooth functioning, the chosen material must be softer than screw 18.

With the receptacle 20 being softer than screw 18, slot 30 of screw 18 should not extend over head diameter 28. Instead, slot 30 is spaced apart from diameter 28 so as not to raise any sharp edges that could damage bore 32 of receptacle 20. It is desirable to have the entire circumference of major diameter 28 to be smooth.

Figure 3:
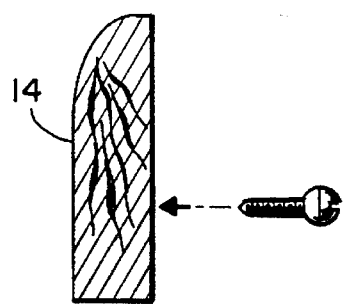
FIG. 3 shows a ball head screw being inserted in trim.

There are several methods snap tack 26 can be installed. In one method, screw 18 is screwed into trim 14 as shown in FIG. 3. Trim 14 with screw 18 is positioned against a mounting surface 46. In this embodiment of the invention, mounting surface 46 comprises gypsum board 48 and two-by-fours 50. Gypsum board 48 consists of hydrous calcium sulfate. Two-by-four 50 is a piece of lumber nominally 2 inches by 4 inches and is typically milled to 1.625 inches by 3.625 inches (plus or minus 0.25 inches).

Figure 4:
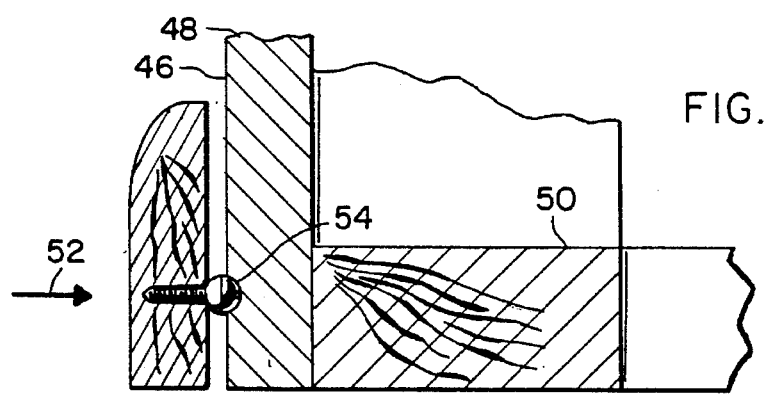
FIG. 4 shows a ball head screw being used to mark a dimple in a wall.
Figure 5:
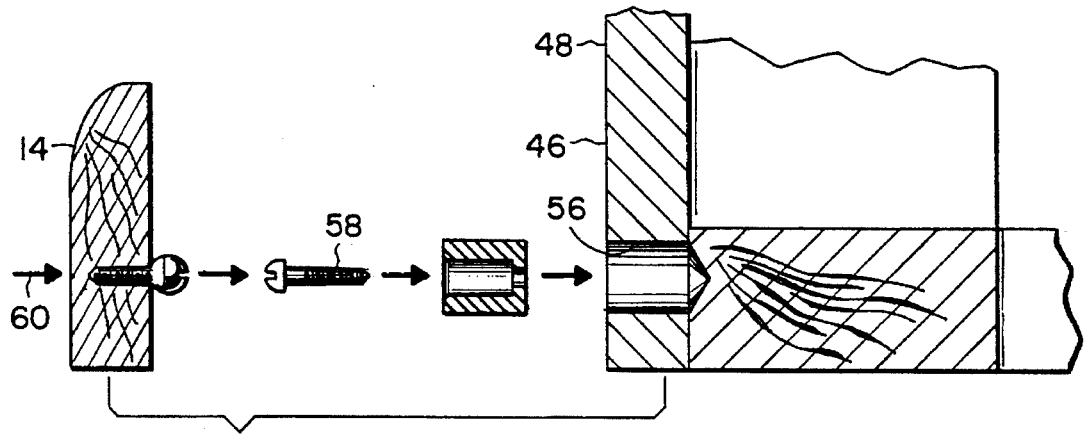
FIG. 5 shows installation of a receptacle and installation of trim.

Trim 14 is hit as indicated by arrow 52 of FIG. 4 to produce indentations 54 into surface 46. In FIG. 5, holes 56 are drilled at indentations 54 and receptacle 20 is anchored in place by screw 58. Trim 14 with screws 18 is pressed into place as shown by arrow 60.

Figure 6:
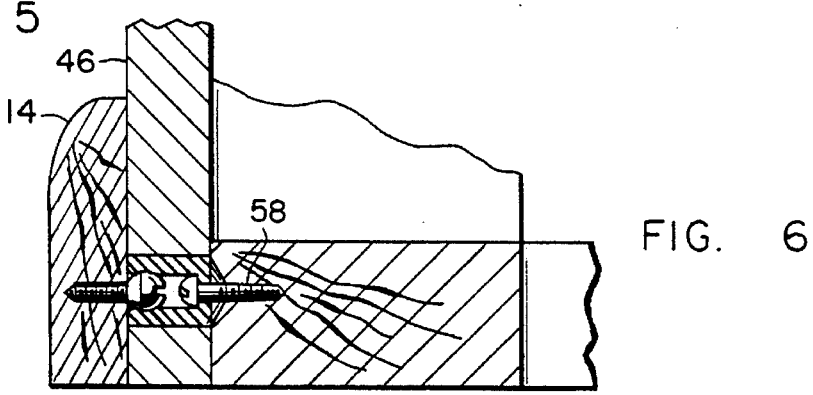
FIG. 6 shows trim mounted by way of the subject invention.

FIG. 6 shows a completed assembly having trim that can be repeatedly removed and reinstalled.

Figure 7:
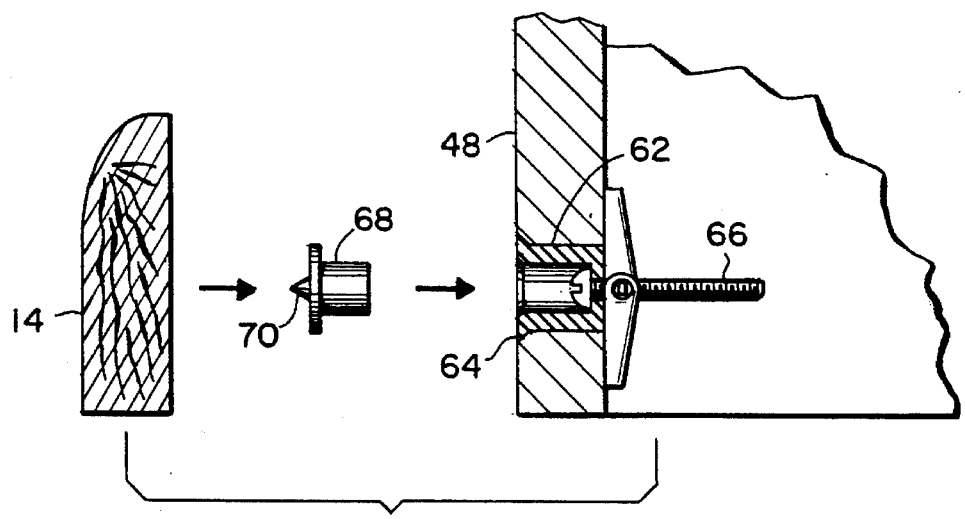
FIGS. 7–9 illustrates an alternative embodiment of the invention.
Figure 8:
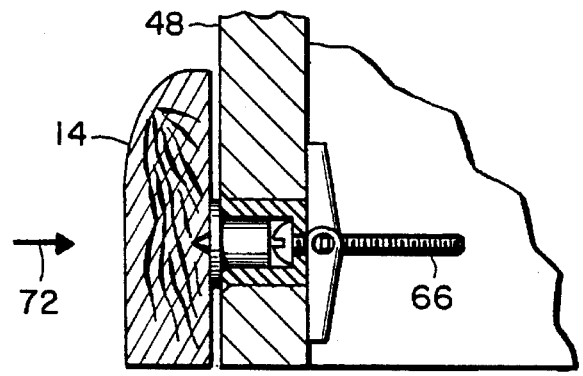
Figure 9:
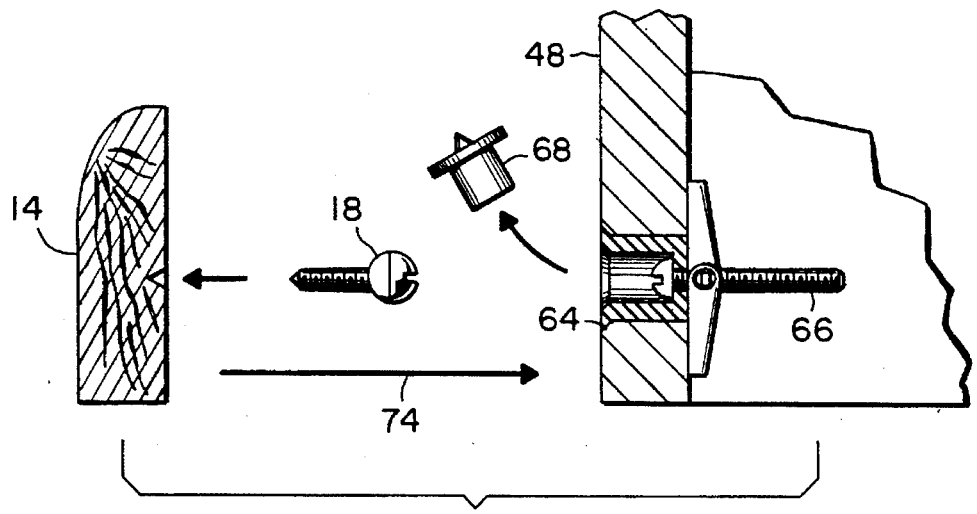

FIGS. 7, 8 and 9 show another method of installing trim 14 using snap tacks 16. The Figures show the mounting surface to be gypsum board 48 without a two-by-four back support. In this case a receptacle 62 has a slight flange 64 and the mounting screw is a conventional toggle bolt 66. A hole is drilled into board 48, then receptacle 62 is inserted and held in place by toggle bolt 66. A marker plug 68 with a center punch point 70 is temporarily inserted into receptacle 62. Trim 14 is placed against plug 68 and struck as shown by arrow 72 to mark the desired screw location on trim 14. Screw 18 is fastened to trim 14 at the center punch mark. Trim 14 with screw 18 is then pressed as indicated by arrow 74 against gypsum board 48 to complete the removable assembly.

There are many other variations that are well within the scope of the invention. For example, screw 18 can be fastened to wall 46 and a receptacle 76 anchored to trim 14 as shown in FIG. 10.

Figure 10:
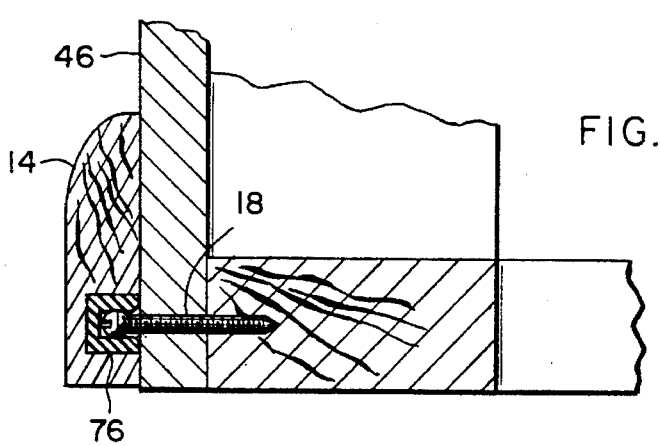
FIG. 10 illustrates another embodiment of the invention.

Moreover, still referring to FIG. 10, receptacle 76 can be an integral part of trim 14 as produced by a trim manufacturer. Marker plug 68 can be inserted in the trim's integral receptacle 76 to aid in marking the ball screw locations on surface 46. Similarly, a trim manufacturer can make screw 18 as an integral part of trim 14 while receptacle 20 is installed by a carpenter.

Figure 11:
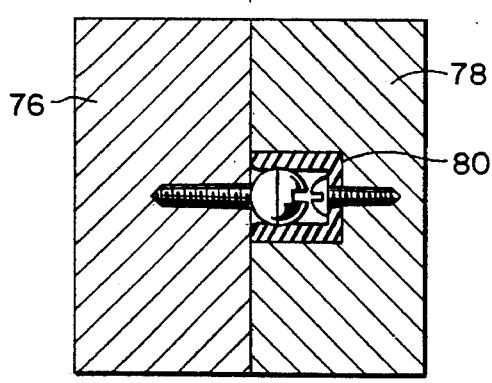
FIG. 11 shows another embodiment of the invention.
Figure 12:
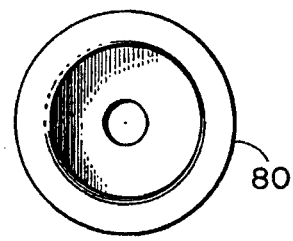
FIG. 12 is a partial end view of FIG. 11.
Figure 14:
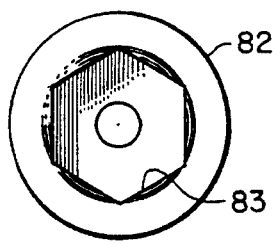
FIG. 14 is partial end view of FIG. 13.
Figure 13:
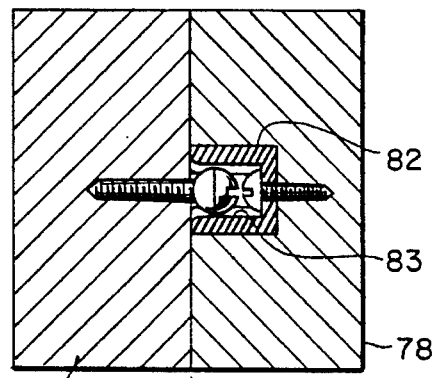
FIG. 13 shows another embodiment of the invention.
Figure 15:
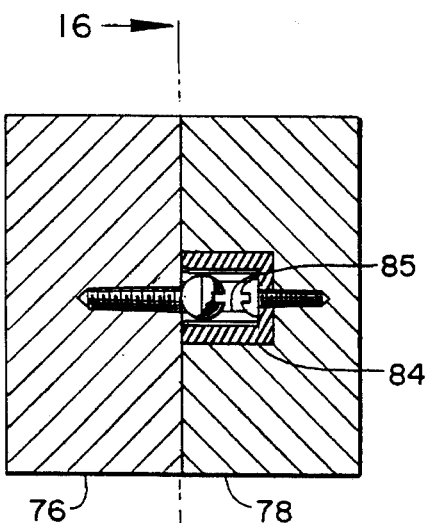
FIG. 15 shows another embodiment of the invention.
Figure 16:
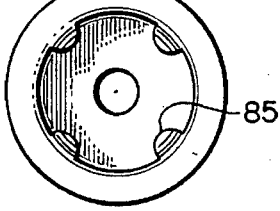
FIG. 16 is a partial end view of FIG. 15.
Figure 17:
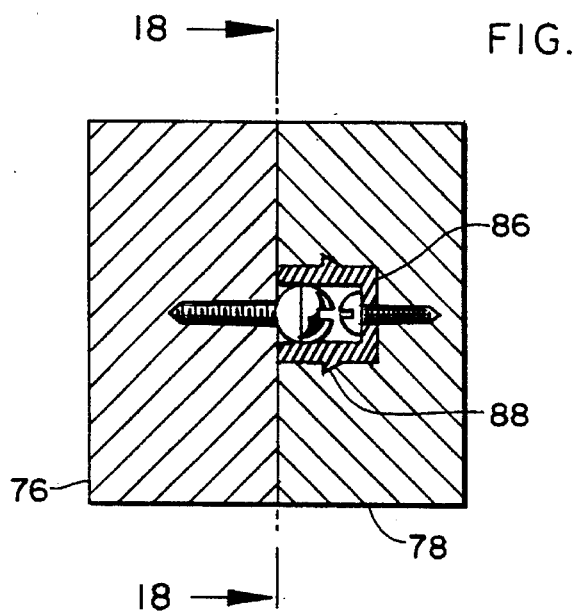
FIG. 17 shows another embodiment of the invention.
Figure 18:
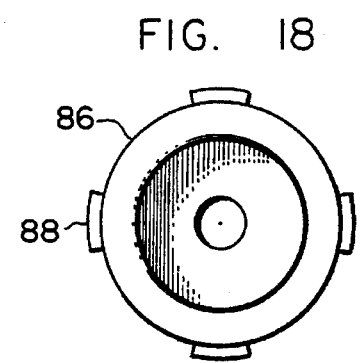
FIG. 18 is a partial end view of FIG. 17.
Figure 20:
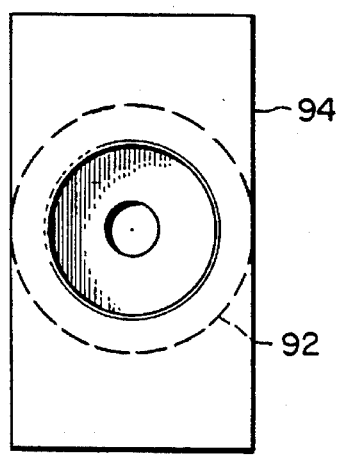
FIG. 20 is a partial end view of FIG. 17.
Figure 19:
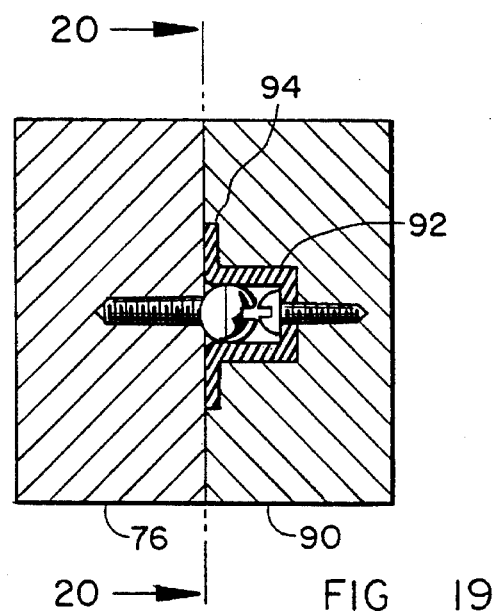
FIG. 19 shows another embodiment of the invention.

It should also be appreciated that this invention is also well suited for the assembly of furniture having components made of wood products such as particle board, plywood, or wood itself. In such an application, items 12 and 14 should be considered as one wood product component and item 48 would be considered as another wood product component where they'd be joined to comprise a furniture assembly. FIGS. 11 and 12 show two wood products 76 and 78 joined via receptacle 80. FIG. 13 and 14 show two wood products 76 and 78 joined by a receptacle 82 having a hexagonal bore 83. FIGS. 15 and 16 show two wood products 76 and 78 joined by a receptacle 84 having a plurality of flutes 85. FIGS. 17 and 18 show two wood products 76 and 78 joined by a receptacle 86 having at least one tooth 88 for gripping item 78. FIGS. 19 and 20 show two wood products 76 and 90 joined by a receptacle 92 having a flange 94.

Although the invention is described with respect to a preferred embodiment, modifications thereto will be apparent to those skilled in the art. Therefore, the scope of the invention is to be determined by reference to the claims which follow.

I claim:

1. A method of installing a wood product against a mounting surface comprising the steps of:

screwing a plurality of metallic ball head screws into a backside of said wood product, each head of said plurality of ball head screws having a curved top portion and a curved bottom portion, said curved top portion being joined to said curved bottom portion at a major outside diameter, each head of said plurality of ball head screws having a socket to facilitate screwing into said wood product, each said socket being spaced apart from said major outside diameter to provide said major outside diameter with a substantially smooth uninterrupted surface;

positioning said wood product with said ball head screws against a mounting surface with said curved top portion of said ball head screws being pressed against said mounting surface;

striking a front side of said wood product with enough force to drive said ball head screws partially into said mounting surface to leave a plurality of indentations in said mounting surface corresponding to the location of each of said plurality of ball head screws;

drilling a plurality of holes into said mounting surface at the locations marked by said plurality of indentations;

inserting a plurality of polymeric receptacles in said plurality of holes, said receptacles having a substantially cylindrical side wall with one end substantially open and having a substantially circular base at an opposite end, said side wall defining a bore having an inside diameter that is smaller than said major outside diameter of said plurality of ball head screws, said substantially circular base having an anchor hole therethrough;

anchoring said polymeric receptacles in said mounting surface by putting a mounting screw through said anchor hole and fastening said mounting screw to said mounting surface;

positioning said wood product to align said plurality of ball head screws to said plurality of polymeric receptacles in said plurality of holes; and striking said front side of said wood product to force, said plurality of ball head screws into said polymeric receptacles in said plurality of holes to removably hold said wood product in place.

2. The method as recited in claim 1, wherein one said polymeric receptacle includes a flange that limits the extent to which said receptacle can extend into one of said plurality of holes into said mounting surface.

3. The method as recited in claim 2, wherein said mounting screw is a toggle bolt.

4. The method as recited in claim 1, wherein said mounting surface is gypsum board fastened to a two-by-four.

5. A method of installing trim against a mounting surface comprising the steps of:

screwing a plurality of metallic ball head screws into said mounting surface, each head of said plurality of ball head screws having a curved top portion and a curved bottom portion, said curved top portions being joined to said curved bottom portion at a major outside diameter, each head of said plurality of ball head screws having a socket to facilitate screwing into said mounting surface, each said socket being spaced apart from said major outside diameter to provide said major outside diameter with a substantially smooth uninterrupted surface;

pushing a back side of said trim toward said mounting surface with said curved top portion of said ball head screws being pressed against said trim;

striking a front side of said trim with enough force to drive said ball head screws partially into said trim to leave a plurality of indentations in said trim corresponding to the location of each of said plurality of ball head screws;

drilling a plurality of holes into said trim at the locations marked by said plurality of indentations;

inserting a plurality of polymeric receptacles in said plurality of holes, said receptacles having a generally cylindrical side wall with one end substantially open and having substantially circular base at an opposite end, said side wall defining a bore with a majority of said bore having its said inside diameter smaller than said major outside diameter of said plurality of ball head screws, said substantially circular base having an anchor hole therethrough;

anchoring said polymeric receptacles in said trim by putting a mounting screw through said anchor hole and fastening said mounting screw to said trim;

positioning said trim to align said plurality of ball head screws to said plurality of polymeric receptacles in said plurality of holes; and striking said front side of said trim to force said plurality of ball head screws into said plurality of polymeric receptacles in said plurality of holes to removably hold said trim in place.

6. The method as recited in claim 5, wherein said mounting surface is gypsum board fastened to a two-by-four.

7. A wood product assembly, comprising:

a first wood product;

a metallic ball head screw threadingly engaging said first wood product, said metallic ball head screw having a head with a curved top portion and a curved bottom portion, said curved top portion being joined to said curved bottom portion at a major outside diameter, said head having a socket spaced apart from said major outside diameter to provide said major outside diameter with a substantially smooth uninterrupted surface;

a second wood product;

a polymeric receptacle, embedded in said second wood product, said polymeric receptacle having a base at one end and being open at an opposite end to define a bore for receiving said head of said metallic ball head screw through said opposite end in a press fit relationship, whereby said first wood product becomes joined to said second wood product while completely enclosing said metallic ball head screw and said polyeric receptacle; and an anchor screw extending through an anchor hole in said base of said polymeric recptacle and threadingly engaging said second wood product.

8. The assembly of claim 7 wherein said bore is polygonal.

9. The assembly of claim 7 further comprising a plurality of flutes extending longitudinally along the length of said bore.

10. The assembly of claim 7 further comprising at least one tooth on said polymeric receptacle, said tooth biting into said second wood product to inhibit the removal of said polymeric receptacle from said second wood product.

11. The assembly of claim 7 further comprising a flange integrally joined to said polymeric receptacle at said opposite end.

* * * * *